G. B. TAYLOR.
SPIRAL CHUCK.
APPLICATION FILED AUG. 7, 1908.

923,730.

Patented June 1, 1909.
2 SHEETS—SHEET 1.

Witnesses:

Inventor
George B. Taylor
By
James L. Norris

G. B. TAYLOR.
SPIRAL CHUCK.
APPLICATION FILED AUG. 7, 1908.

923,730.

Patented June 1, 1909.
2 SHEETS—SHEET 2.

Witnesses:

Inventor
George B. Taylor
By
James L. Norris
Atty

UNITED STATES PATENT OFFICE.

GEORGE BENJAMIN TAYLOR, OF BIRMINGHAM, ENGLAND.

SPIRAL CHUCK.

No. 923,730.  Specification of Letters Patent.  Patented June 1, 1909.

Application filed August 7, 1908. Serial No. 447,470.

*To all whom it may concern:*

Be it known that I, GEORGE BENJAMIN TAYLOR, a subject of the King of Great Britain, residing at Birmingham, in the county of Warwick, England, have invented new and useful Improvements in Spiral Chucks, of which the following is a specification.

This invention relates to new and useful improvements in spiral chucks and more particularly to improvements in chucks of the type illustrated in the English patent to Taylor *et al.*, No. 23,736 of 1893.

In chucks of this type of construction the essential structural features are a rotatable ring having a spiral feed thread and radial ways or grooves, the jaws disposed in said ways or grooves for radial movement and having teeth to mesh with the convolutions of said feed thread by means of which the jaws are moved radially in either direction. The rotatable ring is formed with bevel teeth which are in mesh with one or more hand-operated bevel pinions, the latter constituting a means for rotating said ring in effecting an adjustment of the jaws.

The present improvements deal with the tooth and spiral thread connections between the jaws and the ring and provide a simple and effective means for automatically keeping the threads of the ring properly in engagement with the teeth of the jaws and thereby compensating for wear between said teeth and the thread, it being very necessary for the accurate working of such chuck that there shall be no lost motion between the jaws and the ring and that all the jaws should operate collectively and to the same degree.

Figure 1:
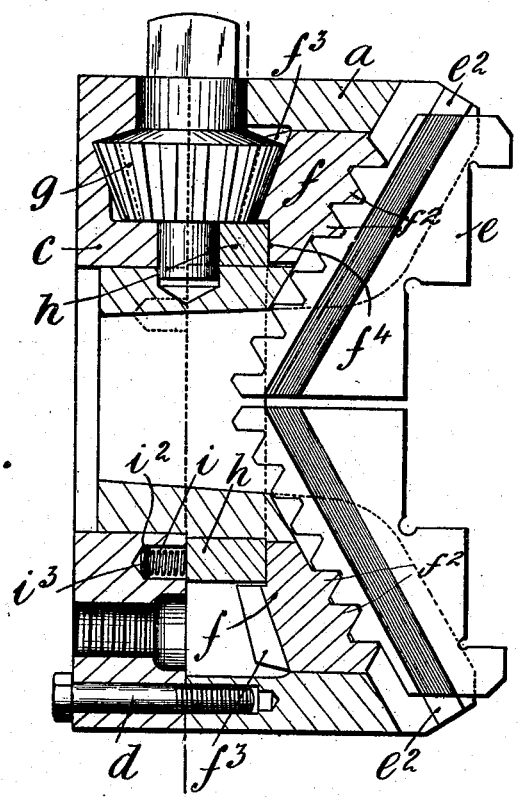
Figure 3:
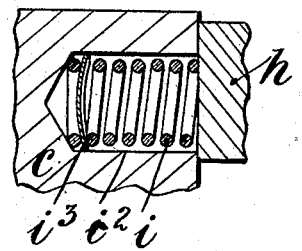
Figure 2:
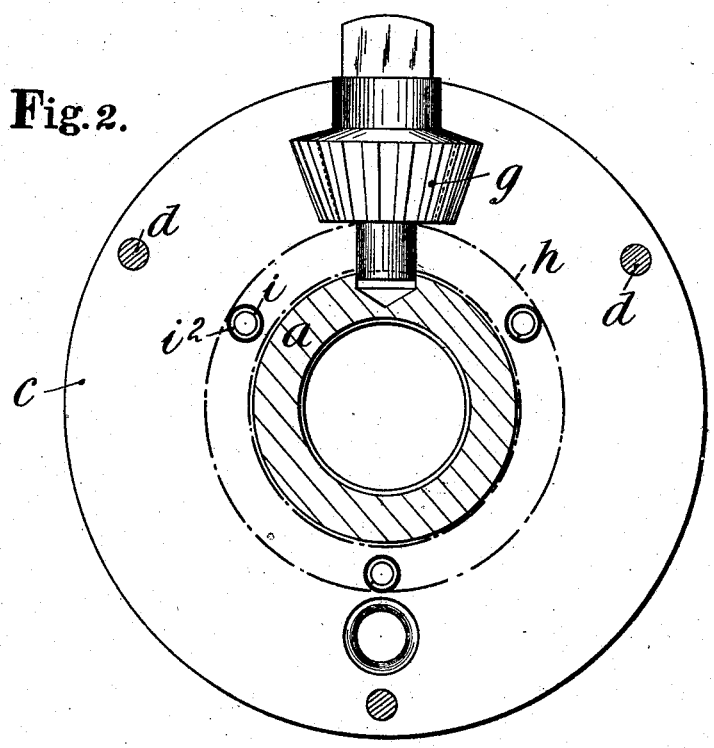

The present improvements will be clearly understood from the description hereinafter given and in which reference is made to the accompanying drawings wherein, Figure 1 is a central longitudinal sectional view of a spiral chuck constructed in accordance with the present invention. Fig. 2 is a transverse section on the dotted line of Fig. 1, and Fig. 3 is an enlarged detail sectional view illustrating devices which act upon the rotatable feed ring for the purpose of taking up wear as aforesaid.

The body of the chuck is as usual built up of two parts $a$ and $c$ which are connected detachably as by bolts $d$, this arrangement providing for convenience in manufacture and assemblage of parts. The jaws $e$ slide in radial ways $e^2$ in the chuck face and are effectually guided therein in the usual way in such a chuck.

$f$ is the usual rotatable ring, having at $f^2$ a spiral feed thread and at $f^3$ a ring of bevel teeth, the said ring of teeth being engaged by the bevel pinion $g$, which takes its bearings in the chuck body. The spiral thread $f^2$ engages in the usual manner corresponding teeth on the rear faces of the jaws $e$.

The ring $f$ fits in the interior of the chuck body without binding and is held to properly engage its threads $f^2$ with the teeth of the jaws $e$ by a follower or bearer ring $h$ which operates axially of the chuck against a true surface $f^4$ of the spiral ring and is actuated in such operation through the agency of a number of springs or other equivalent elastic devices $i$ which are placed between the rear face of the ring $h$ and the part $c$ of the chuck body. The devices $i$ efficiently force the threads of the ring $f$ into proper engagement with the teeth of the jaws $e$ and maintain such engagement as wear takes place between the said thread and the teeth, the springs at the same time forming an elastic abutment between the spiral ring and the chuck body in the axial direction of the latter.

The springs $i$ are located in recesses $i^2$ within the rear portion $c$ of the chuck body, and a device such as a disk or plate $i^3$ is used in connection with each of the holes and the spring to hold each spring in position within its hole while the chuck parts are being assembled and at any time while the two parts of the chuck body are separated for replacing other parts, the device $i^3$ thereby preventing the accidental loss of the springs.

Instead of metallic coil springs as shown, rubber blocks or other convenient resilient devices may be employed, the idea of the invention being an automatic pressure of the thread of the ring $f$ into engagement with the teeth of the jaws, such pressure to compensate for wear.

Having fully described my invention, I claim:—

1. In a spiral chuck, the combination with a body part, of a plurality of jaws working in radial ways in the chuck face and having teeth on the backs thereof, a ring rotatably asembled with respect to said body part and having a spiral thread to engage the teeth of said jaws, and spring means acting upon said ring to force the latter toward said jaws and to take up wear between said teeth and said spiral thread.

2. In a spiral chuck, the combination with a body part having radial ways in its face, of a plurality of jaws working in said radial ways and having teeth on the back thereof, a ring rotatably assembled with respect to said body part and having a spiral thread to mesh with said teeth, a follower ring engaging the rear face of the threaded ring, and springs acting upon said follower ring and causing the latter to force said threaded ring toward said jaws and thereby compensate for wear between said teeth and said spiral thread.

3. In a spiral chuck, the combination with a body part having radial ways in its face, of a plurality of jaws working in said ways and having teeth on the backs thereof, a ring rotatably assembled with respect to said follower part and having a spiral thread to mesh with the teeth of said jaws, said body part having recesses in its rear portion, means for forcing said ring toward said jaws to thereby compensate for wear between said teeth and said thread, said means including spiral springs disposed in said recesses, and means for holding said springs against displacement from said recesses.

4. In a spiral chuck, the combination with a body part having radial ways in its face, of a plurality of jaws working in said radial ways and having teeth on the backs thereof, a ring rotatably assembled with respect to said body part and having a spiral thread to engage with said teeth, said body part having recesses in the rear portion thereof, and means for moving said ring toward said jaws to thereby take up wear between said teeth and said spiral thread, said means including spiral springs disposed in said recesses and retaining disks disposed in said recesses between the convolutions of said springs.

5. In a chuck the combination with two engaged relatively movable parts of means for compensating for wear between said parts comprising a body part having recesses therein, spiral springs in said recesses and arranged to exert an influence upon one of said parts to move it toward the other part, and disks in said recesses and disposed between the convolutions of said springs to hold the latter against displacement from said recesses.

In witness whereof I have hereunto set my hand in presence of two witnesses.

GEORGE BENJAMIN TAYLOR.

Witnesses:
 GEO. FUERY,
 FRANCIS ARTHUR BINNS.